United States Patent
Chen et al.

(10) Patent No.: US 9,230,069 B2
(45) Date of Patent: Jan. 5, 2016

(54) EXECUTION-BASED LICENSE DISCOVERY AND OPTIMIZATION

(71) Applicant: International Business Machines Corporation, Armonk, NY (US)

(72) Inventors: Han Chen, White Plains, NY (US); Nicholas Fuller, North Hills, NY (US); Liangzhao Zeng, Mohegan Lake, NY (US); Zhe Zhang, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 13/863,944

(22) Filed: Apr. 16, 2013

(65) Prior Publication Data

US 2014/0310817 A1    Oct. 16, 2014

(51) Int. Cl.
*G06F 7/04*     (2006.01)
*G06F 17/30*    (2006.01)
*H04N 7/16*     (2011.01)
*G06F 21/10*    (2013.01)

(52) U.S. Cl.
CPC ...... *G06F 21/105* (2013.01); *G06F 2221/0775* (2013.01)

(58) Field of Classification Search
CPC ....... G06F 21/60; G06F 21/10; G06F 21/105; G06F 21/62; H04L 63/10
USPC .......................................................... 726/26
See application file for complete search history.

(56) References Cited

U.S. PATENT DOCUMENTS

| | | |
|---|---|---|
| 6,681,331 B1 | 1/2004 | Munson et al. |
| 8,180,724 B1 | 5/2012 | Qureshi et al. |
| 8,997,242 B2 | 3/2015 | Chen et al. |
| 2001/0011253 A1* | 8/2001 | Coley et al. ............. 705/59 |
| 2003/0083995 A1* | 5/2003 | Ramachandran et al. ...... 705/52 |
| 2007/0050604 A1 | 3/2007 | Ferren et al. |
| 2010/0057905 A1 | 3/2010 | Enscoe et al. |
| 2011/0251937 A1 | 10/2011 | Falk et al. |
| 2012/0059917 A1 | 3/2012 | Dawson et al. |

FOREIGN PATENT DOCUMENTS

WO    2009115367 A1    9/2009

OTHER PUBLICATIONS

Whalley et al. License-aware Management of Virtual Machines, Integrated Network Management (IM), 2011 IFIP/IEEE, May 2011.
Ciolkowski et al., Software Reviews: The State of the Practice, IEEE Software, 2003, 6 pages.

* cited by examiner

*Primary Examiner* — Kambiz Zand
*Assistant Examiner* — Stephen Sanders
(74) *Attorney, Agent, or Firm* — Ryan, Mason & Lewis, LLP

(57) ABSTRACT

Techniques for execution-based license discovery and optimization. A method includes collecting execution information for one or more software processes on one or more servers in an operating system, mapping the collected execution information for the one or more software processes to one or more software products, determining usage of a software product in the operating system based on the mapping of the collected execution information for the one or more software processes to one or more software products, and identifying one or more software product license optimization opportunities based on a comparison of the determined usage of the software product in the operating system and an indication of all installations of the software product in the operating system.

14 Claims, 2 Drawing Sheets

EXECUTION-BASED LICENSE DISCOVERY AND OPTIMIZATION

FIELD OF THE INVENTION

Embodiments of the invention generally relate to information technology, and, more particularly, to license management.

BACKGROUND

Software licenses cover the usage of a software product, while current software licensing options are largely based on installations. Accordingly, a software product needs to be licensed if it is installed on a computer or similar device. Installations can be discovered by scanning storage devices (for example, hard disks) and identifying matching signatures. Such discovery techniques, however, incur significant overhead costs.

Moreover, installation of a software product does not equal usage of a software product. For example, a context within which installation without usage can occur might include a change of software deployment, or wherein a software product is uninstalled without wiping the corresponding storage area. Additionally, a context within which usage without installation can occur might include a transfer of an executable program of a software product through a network. Such a scenario would pose challenges because it may be infeasible to scan all network-accessible devices.

In a managed cloud computing environment, management-based discovery may be used, while in an unmanaged infrastructure as a service (IaaS) environment, customers can install and use software products without going through a centralized portal. In many such instances, software products are stored in virtual machine (VM) images, and such VM images might be remote from the compute nodes. As such, scanning such an environment would also likely incur significant overhead costs and can be inaccurate due to remotely attached storage.

Accordingly, a need exists to efficiently discover software products that should properly be licensed on hardware assets, as well as to optimize software deployment on hardware assets to reduce software licensing costs.

SUMMARY

In one aspect of the present invention, techniques for execution-based license discovery and optimization are provided. An exemplary computer-implemented method can include steps of collecting execution information for one or more software processes on one or more servers in an operating system, mapping the collected execution information for the one or more software processes to one or more software products, determining usage of a software product in the operating system based on the mapping of the collected execution information for the one or more software processes to one or more software products, and identifying one or more software product license optimization opportunities based on a comparison of the determined usage of the software product in the operating system and an indication of all installations of the software product in the operating system.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
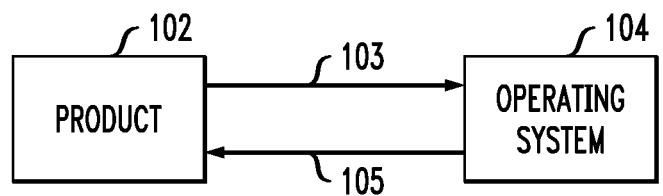
FIG. 1 is a diagram illustrating an interface aspect, according to an embodiment of the present invention.

As described herein, an aspect of the present invention includes techniques for execution-based license discovery and optimization. At least one embodiment of the invention includes discovering usage of a software product through execution traces of the software product in an operating system (OS). The execution traces accurately report the software usage, and can also provide indications and/or suggestions on optimizing software deployment, such as removing unused or lightly-used software installations, and/or consolidating software instances with non-overlapping usage patterns.

For example, at least one embodiment of the invention includes periodically checking or assessing an OS process table, and parsing the usage pattern of each relevant software product through software executable names. Based on such collected data, an aspect of the invention includes building or generating a time series of each process.

Accordingly, at least one embodiment of the invention includes discovering software usage via collecting execution information for each of multiple processes in an OS. Such information can include, for example, process name, the state of the process (running, sleeping, etc.), the percentage of central processing unit (CPU) usage by the process, the total memory usage by the process, resource consumption of the process, input/output (I/O) transactions and bytes per second.

Also, an aspect of the invention includes establishing a profile for each software product and/or process on each server in the OS. Such a profile can contain, for example, the time series of resource consumption for the given software product and/or process. Additionally, at least one embodiment of the invention further includes mapping the process name to a particular software product.

Utilizing the collected execution information, at least one embodiment of the invention includes identifying unexecuted but installed software products as candidates for deletion. By way of example, if a given account licenses 20 servers for a software product, but only six of the servers have the product actively running, the remaining servers may include candidates for deletion. Identification of such candidates can include, for example, combining a process profile with scanning results to determine an instance of installation of a software product without usage thereof.

As used above, scanning refers to scanning storage devices (hard disk drives, etc). Accordingly, if a process for a product is not found (indicating that the product is not running), but the scanning results show that the product is installed on the device, the installed copy should be removed.

Additionally, at least one embodiment of the invention includes identifying light or non-overlapping usage patterns of software installations as candidates for consolidation and/or multiplexing. By way of example, in a cloud setting, multiple physical and virtual servers running a relational database management system with light workloads might serve as consolidation candidates.

In at least one embodiment of the invention, a threshold can be pre-configured for quantifying workloads. For example, if a product instance uses less than 10% of CPU, less than 100 megabytes (MB) of dynamic random-access memory (DRAM), and less than one megabyte per second (MB/sec) of disk input/output (I/O), the workload can be considered light. Additionally, in at least one embodiment of the invention, relevant information is obtained through collecting execution information, as well as through a process-to-product map.

Further, a consolidation involves migrating some processes from a first server to a second server. By way of example, consider a scenario originally including five physical servers, each hosting one virtual machine (VM) running a product. After the analysis of workload, it can be decided to migrate all five VMs to a single physical server (for example, to reduce the license fee).

At least one embodiment of the invention also includes identifying additional opportunities for further consolidation actions. Such an opportunity can include, for example, obtaining additional components (such as an addition server) and/or hardware to further consolidate usage. Also, such an opportunity might include, for instance, moving or transferring component usage (such as, for example, a database usage) from a given server to a different server in the OS, or interchanging relational database management system usage on a given server with separate database usage on a different server in the OS. In at least one embodiment of the invention, the suggested action can be provided to a user and/or administrator as a suggestion, and/or the OS can automatically carry out the suggested optimization action. Additionally, in at least one embodiment of the invention, collected execution information can be provided as input to a license optimization engine for automated identification of such opportunities.

FIG. 1 is a diagram illustrating an interface aspect, according to an embodiment of the present invention. By way of illustration, FIG. 1 depicts a software product 102 and an operating system (OS) 104. As depicted, the product 102 specifies possible licensing options to the OS 104 via communication 103. Such licensing options can include, for example, percentage of CPU usage, a memory high watermark, and a disk input/output operations per second (IOPS) high watermark. A communication such as 103 might, by way merely of example, include an indication such as "I can be licensed by X % CPU or a memory high watermark."

The OS 104, as detailed herein, maintains knowledge on how many licenses of each type are entitled on a given server, and the OS 104 provides such information to the software product 102 via communication 105. A communication such as 105 might, by way merely of example, include an indication such as "You are currently using 25% CPU and 500 MB memory."

Based on communications such as depicted via 103 and 105, at least one embodiment of the invention includes allocating software licenses in a coordinated manner with other resources (CPU, memory, etc.). By way of example, if a server is entitled only with 30% of CPU usage of a product P, the process of P can be given a low priority in CPU scheduling if the quota is nearly used up.

Figure 2:
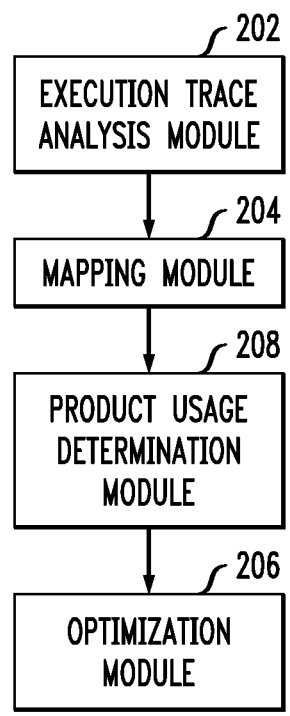
FIG. 2 is a block diagram illustrating an example embodiment, according to an aspect of the invention.

FIG. 2 is a block diagram illustrating an example embodiment, according to an aspect of the invention. By way of illustration, FIG. 2 depicts an executing trace analysis module 202, a mapping module 204, a product usage determination module 208 and an optimization module 206. The function of each of these modules is described in conjunction with FIG. 3 below.

Figure 3:
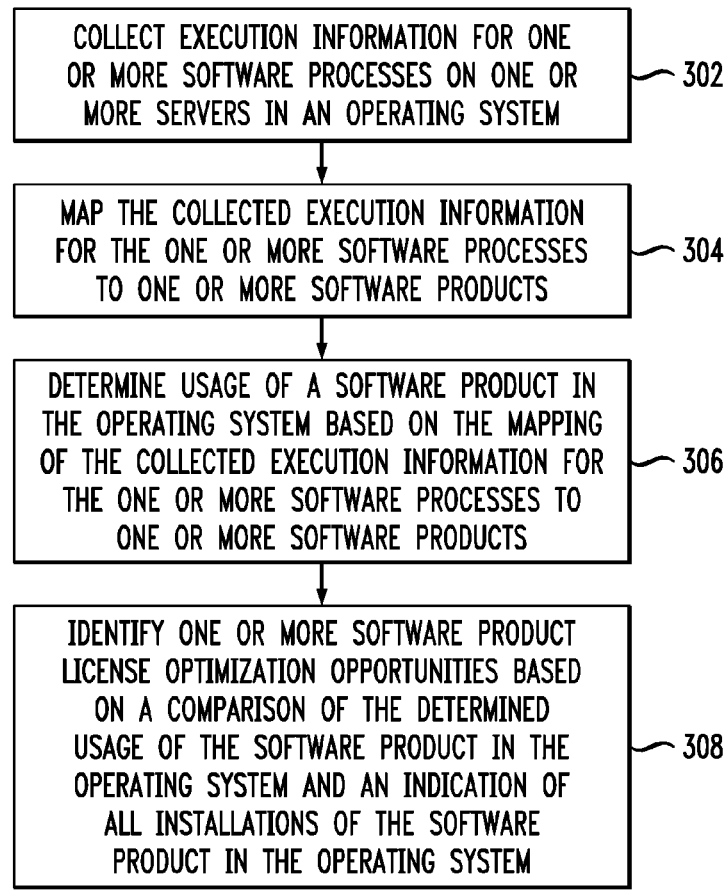
FIG. 3 is a flow diagram illustrating techniques according to an embodiment of the invention.

FIG. 3 is a flow diagram illustrating techniques according to an embodiment of the present invention. Step 302 includes collecting execution information for one or more software processes on one or more servers in an operating system (as carried out, for example, by executing trace analysis module 202 such as depicted in FIG. 2). As detailed herein, execution information can include process name, process state, percentage of central processing unit used by a process, total memory used by a process, resource consumption of a process, and/or input/output (I/O) transactions of a process. Collecting execution information can include periodically accessing a system process table associated with the operating system. The techniques depicted in FIG. 3 can also include generating a time series for each of the one or more software processes based on the collected execution information.

Step 304 includes mapping the collected execution information for the one or more software processes to one or more software products (as carried out, for example, by mapping module 204 such as depicted in FIG. 2). Step 306 includes determining usage of a software product in the operating system based on the mapping of the collected execution information for the one or more software processes to one or more software products (as carried out, for example, by product usage determination module 208 such as depicted in FIG. 2). The techniques depicted in FIG. 3 can also include generating a profile for the software product. The profile can include a mapping between the software product and each of the one or more software processes that are associated with the software product. Additionally, at least one embodiment of the invention includes encoding the profile into a matrix.

Step 308 includes identifying one or more software product license optimization opportunities based on a comparison of the determined usage of the software product in the operating system and an indication of all installations of the software product in the operating system (as carried out, for example, by optimization module 206 such as depicted in FIG. 2). The indication of all installations can include, for example, a scan report. The identifying step can include identifying an opportunity for removal of an unused installation of the software product, as well as identifying an opportunity for adding one or more items of hardware for consolidation of two or more installations of the software product.

Additionally, the identifying step can include identifying an opportunity for consolidating two or more installations of the software product. This can further include, for example, identifying an installation of the software product having a low level of usage, transferring the installation of the software product having the low level of usage to a server comprising an installation of the same software product.

Further, in at least one embodiment of the invention the identifying step can include identifying an opportunity for interchanging usages of two different software products installed on two different servers. This can include, for example, transferring the installation of a first software product having a low level of usage from a first server to a target server comprising an installation of the same software product, and transferring, from the target server to the first server, a second software product with a usage level similar to that of the first software product.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and configured to perform exemplary method steps.

Figure 4:
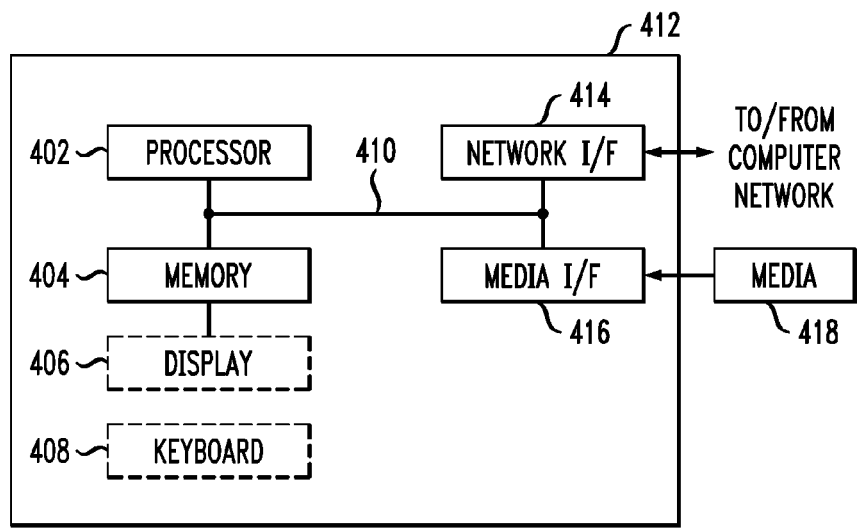
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like.

In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, radio frequency (RF), etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, optimizing software deployment on hardware assets to reduce software licensing costs.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
collecting multiple parameters of execution information for one or more software processes on one or more servers in an operating system;
generating a time series for each of the multiple collected parameters of execution information for each of the one or more software processes;
mapping each generated time series for the one or more software processes to one or more software products;
determining usage of a software product in the operating system based on the mapping of each generated time series for the one or more software processes to one or more software products; and
identifying one or more software product license optimization opportunities based on a comparison of the determined usage of the software product in the operating system and an indication of all installations of the software product in the operating system;
wherein said collecting, said generating, said mapping, said determining, and said identifying are carried out by a computer device.

2. The method of claim 1, wherein said collecting comprises periodically accessing a system process table associated with the operating system.

3. The method of claim 1, comprising:
generating a profile for the software product.

4. The method of claim 3, where the profile comprises a mapping between the software product and each of the one or more software processes associated with the software product.

5. The method of claim 3, comprising:
encoding the profile into a matrix.

6. The method of claim 1, wherein said indication of all installations comprises a scan report.

7. The method of claim 1, wherein said execution information comprises at least one of process name, process state, percentage of central processing unit used by a process, total memory used by a process, resource consumption of a process, and input/output (I/O) transactions of a process.

8. The method of claim 1, wherein said identifying comprises identifying an opportunity for removal of an unused installation of the software product.

9. The method of claim 1, wherein said identifying comprises identifying an opportunity for consolidating two or more installations of the software product.

10. The method of claim 9, wherein said identifying an opportunity for consolidating two or more installations of the software product comprises identifying an installation of the software product having a low level of usage.

11. The method of claim 10, comprising:
transferring the installation of the software product having the low level of usage to a server comprising an installation of the same software product.

12. The method of claim 1, wherein said identifying comprises identifying an opportunity for interchanging usage of two different software products installed on two different servers.

13. The method of claim 12, comprising:
transferring the installation of a first software product having a low level of usage from a first server to a target server comprising an installation of the same software product; and
transferring, from the target server to the first server, a second software product with a usage level similar to that of the first software product.

14. The method of claim 1, wherein said identifying comprises identifying an opportunity for adding one or more items of hardware for consolidation of two or more installations of the software product.

* * * * *